(12) United States Patent
Low et al.

(10) Patent No.: US 7,175,138 B2
(45) Date of Patent: Feb. 13, 2007

(54) STACKABLE CABLE HANGER

(75) Inventors: David Low, New Lenox, IL (US);
Raymond Horvath, Tinley Park, IL (US); Albert Cox, Orland Park, IL (US); Eric Nofziger, Schaumburg, IL (US); Richard Korczak, Channahon, IL (US)

(73) Assignee: Andrew Corporation, Westchester, IL (US)

( * ) Notice: Subject to any disclaimer, the term of this patent is extended or adjusted under 35 U.S.C. 154(b) by 175 days.

(21) Appl. No.: 10/709,489

(22) Filed: May 10, 2004

(65) Prior Publication Data

US 2005/0247829 A1  Nov. 10, 2005

(51) Int. Cl.
 *F16L 3/22* (2006.01)
(52) U.S. Cl. .................... 248/68.1; 248/74.1; 248/74.4; 24/455; 24/459
(58) Field of Classification Search ............... 248/68.1, 248/74.4, 74.1, 63; 24/455, 459
See application file for complete search history.

(56) References Cited

U.S. PATENT DOCUMENTS

| | | | | |
|---|---|---|---|---|
| 4,099,626 A | * | 7/1978 | Magnussen, Jr. | 211/60.1 |
| 5,046,766 A | * | 9/1991 | Lomberty et al. | 285/419 |
| 5,201,484 A | * | 4/1993 | Thoen | 248/68.1 |
| 5,653,411 A | * | 8/1997 | Picco et al. | 248/74.1 |
| 5,794,897 A | | 8/1998 | Jobin et al. | |
| 5,941,483 A | | 8/1999 | Baginski | |
| 5,971,663 A | * | 10/1999 | Brothers | 405/125 |
| 6,079,673 A | | 6/2000 | Cox | |
| 6,161,804 A | | 12/2000 | Paske et al. | |
| 6,308,921 B1 | | 10/2001 | Borzucki | |
| 6,354,543 B1 | | 3/2002 | Paske | |
| 6,523,790 B2 | | 2/2003 | Sentapali et al. | |
| 6,561,466 B1 | | 5/2003 | Myers et al. | |
| 6,588,712 B2 | | 7/2003 | Brell et al. | |
| 6,622,976 B1 | | 9/2003 | Ianello | |
| 7,007,900 B2 | * | 3/2006 | Goodwin et al. | 248/68.1 |

FOREIGN PATENT DOCUMENTS

| | | |
|---|---|---|
| GB | 2351117 | 12/2000 |
| GB | 2378217 | 2/2003 |

* cited by examiner

*Primary Examiner*—Amy J. Sterling
(74) *Attorney, Agent, or Firm*—Babcock IP, PLLC

(57) ABSTRACT

A cable hanger having shell halves adapted to mate with each other, the shell halves each having an inner surface adapted to cooperate with the other to secure the cable within a cable space. The mating of the shell halves is releasably secured by a means for closure. A bolt hole through the shell halves allows easy mounting of the cable hanger. The shell halves each having, along a vertical mating surface, a means for interlocking adapted to interlock with the means for interlocking of a second cable hanger positioned against the cable hanger along the vertical mating surface. A connection side of the cable hanger may be adapted to have a means for latching to couple with a third cable hanger, positioned connection side to connection side with the cable hanger. The cable hanger allowing additional cables to be added without modifying the mounting of the base hanger.

15 Claims, 3 Drawing Sheets

STACKABLE CABLE HANGER

BACKGROUND OF INVENTION

1. Field of the Invention

This invention relates generally to devices for supporting cables and, in particular, to hangers for securing cables to support structures.

2. Description of Related Art

Cable hangers are commonly used to secure cables to structural members of, for example, antenna towers and or along tunnel walls. Generally, each cable is attached to a structural member by cable hangers mounted at periodically-spaced attachment points.

Antenna towers and or tunnels may be crowded due to the multiplicity of cables required for signal-carrying. Over time, as systems are added, upgraded and or expanded, installation of additional cables may be required. To conserve space, it is desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable-type cable hangers significantly increase the number of cables mountable to a single attachment point.

Prior vertically stackable multiple cable capable cable hangers, for example as disclosed in U.S. Patent Application Publication U.S. 2004/0061030 by Goodwin et al, required opening of the existing cable hanger to insert an additional cable into an unused cable holding space of the cable hanger. The prior cable hanger incorporated mounting hardware comprising a threaded rod that extended through each additional cable hanger in the vertical stack. Besides a significant materials expense, extending the cable hangers into stacked configurations requires initial installation of longer threaded rod than necessary and or exchange of mounting hardware that momentarily removes support for the existing cables, increasing installation complexity and costs.

The various single and multiple cable hangers of different capacities necessitate manufacturing, distribution and storage costs for a family of different hangers and similarly a range of different mounting hardware of varying lengths for each anticipated hanger stack configuration. Competition within the cable hanger market has focused attention on ease of use, reliability, expandability and overall reductions in manufacturing, distribution and installation costs.

Therefore, it is an object of the invention to provide a device that overcomes deficiencies in the prior art.

BRIEF DESCRIPTION OF DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
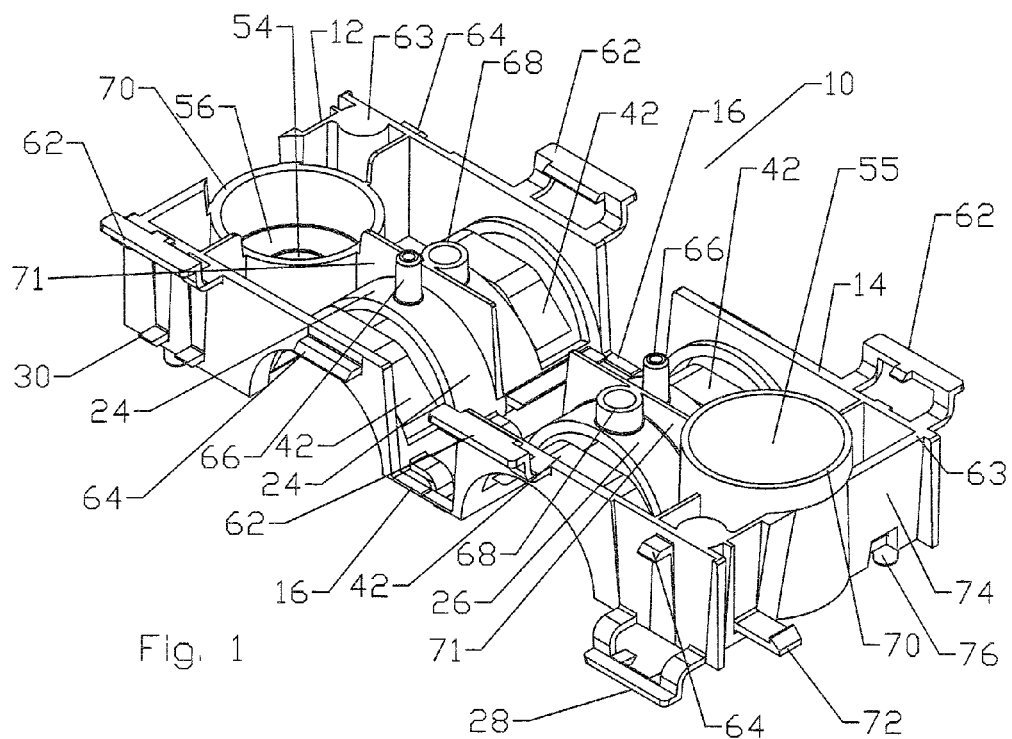
FIG. 1 is a top perspective view of a cable hanger in accordance with the principles of the invention.
Figure 2:
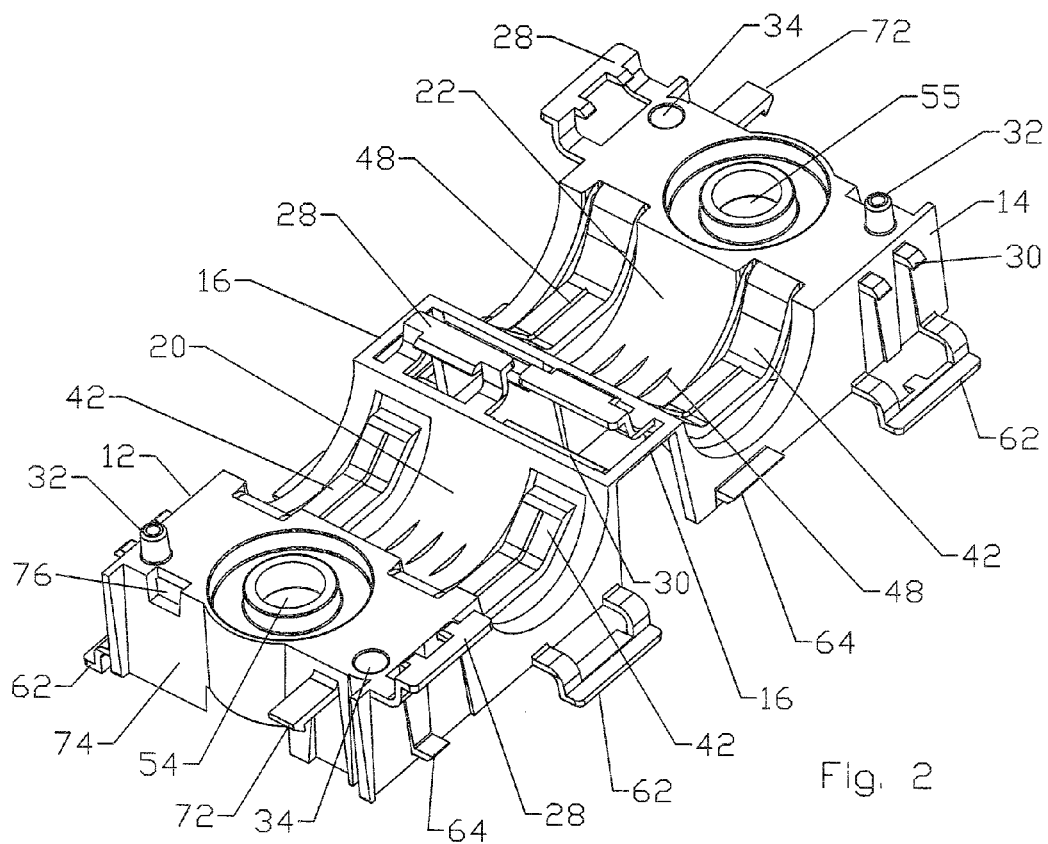
FIG. 2 is a bottom perspective view similar to FIG. 2.
Figure 3:
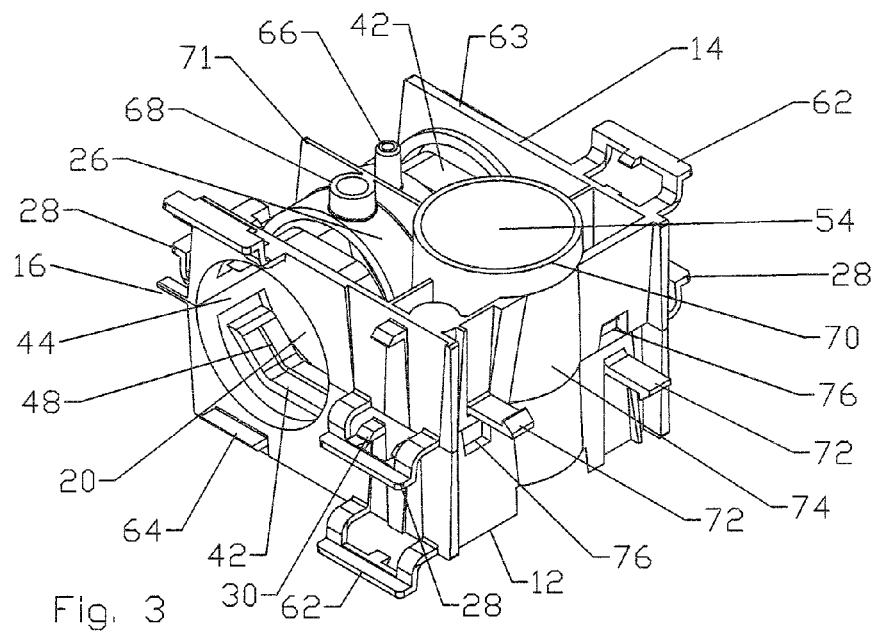
FIG. 3 is perspective view of the cable hanger of FIG. 1, in which the shell halves are folded to a closed position.

With reference to FIGS. 1 and 2, a cable hanger 10 of the invention includes a front shell half 12 and a rear shell half 14 that may be hingeably joined together by one or more spaced-apart assembly hinge(s) 16. The shell halves 12, 14 are folded or closed one onto the other to create an enclosing or encasing structure. When folded, respective front shell half inner surface 20 and rear shell half inner surface 22 of the shell halves 12, 14 have a confronting relationship and respective front shell half outer surface 24 and rear shell half outer surface 26 of the shell halves 12, 14 face away from each other in opposite directions. The assembly hinge(s) 16 may be provided for temporarily coupling the shell halves 12, 14 together for ease of manufacture and or distribution until folding for assembly and may be frangible. The relative thinness of the assembly hinge(s) 16 relative to the shell halves 12, 14 facilitates the folding of the shell halves 12, 14. Cable hanger 10 is self-locking when the shell halves 12, 14 are folded together, as shown in FIG. 3. A releasable snap-interlock means for closure is created, for example, by the interlock between a plurality of closure flange(s) 28 and closure fin(s) 30 of the front shell half 12 that are adapted to mate with and engage corresponding closure flange(s) 28 and closure fin(s) 30 of the rear shell half 14 as the two shell halves 12, 14 are folded together. Closure alignment pin(s) 32 that fit into corresponding closure aperture(s) 34 or the like formed in the shell halves 12, 14 align the respective closure flange(s) 28 with the closure fin(s) 30 and also ensure that the shell halves 12, 14 are aligned together. Thereby, inner surfaces 20, 22 cooperate to surround and secure between them the outer diameter of a desired cable 40 within a cable space 44, as shown in FIG. 4.

The cable 40 may be further retained between the shell halves 12, 14 by a plurality of gripping finger(s) 42 extending into the cable space 44. The gripping finger(s) 42 are adapted to deflect as a cable 40 is inserted into the cable space 44 and the shell halves 12, 14 snap-interlock together, creating a bias against the cable 40 which creates a secure grip upon a desired standard cable 40 outer diameter. The gripping finger(s) 42 operate to extend a range of acceptable cable 40 outer diameter variability resulting from, for example, different production batches of cable and or different cable manufacturers. Retention of the cable 40 within the cable space 44 may be further and or alternatively enhanced by the addition of rib(s) 48 to the respective inner surfaces 20, 22 of the shell halves 12, 14 and or gripping finger(s) 46, if present. The rib(s) 48 may be, for example, spaced apart in a parallel configuration to coincide with the expected spacing of corrugations formed in an outer conductor of the cable 40.

Figure 4:
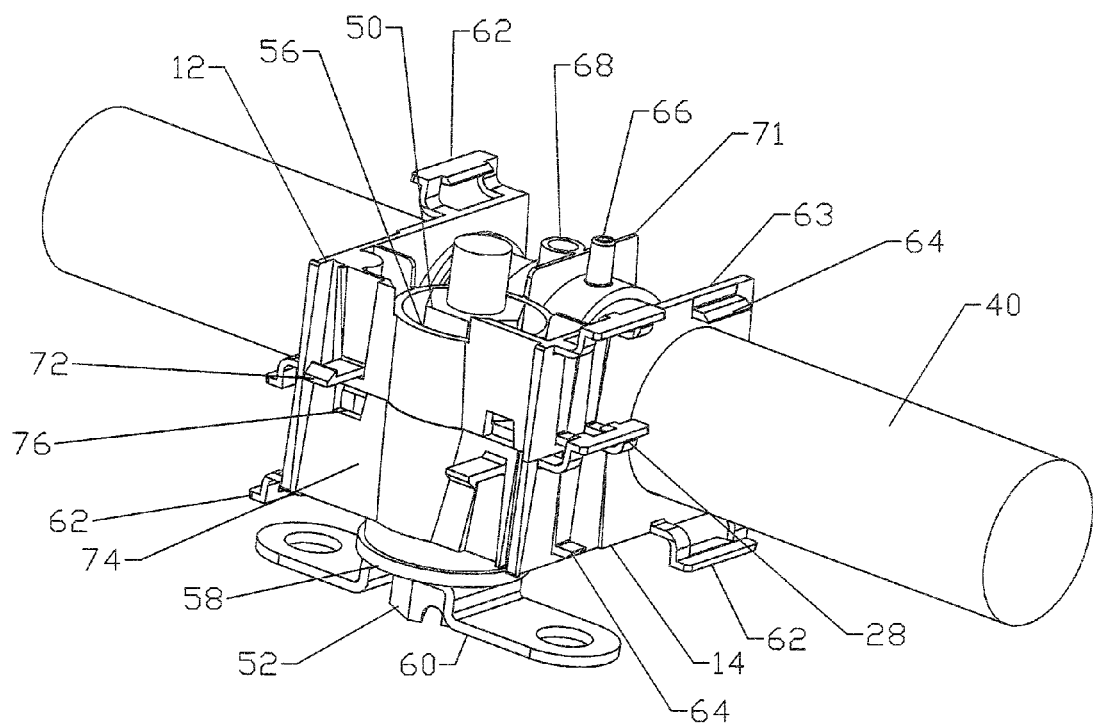
FIG. 4 is a perspective view similar to FIG. 3, showing the cable hanger closed around a cable and secured with typical mounting hardware.

With continued reference to FIG. 4, when snap interlocked around a cable 40, the cable hanger 10 may be coupled to a mounting surface by mounting hardware such as a nut 50 and bolt 52 or the like. Front shell half bolt hole 54 and rear shell half bolt hole 55 respectively formed in the shell halves 12, 14 align when the cable hanger 10 is folded.

A recessed nut surface 56 formed in the front shell half 12 allows the bolt 52, inserted through the bolt hole(s) 54, 55 to be secured via, for example, the nut 50 without requiring a bolt 52 that extends above the top surface of the cable hanger 10.

Figure 5:
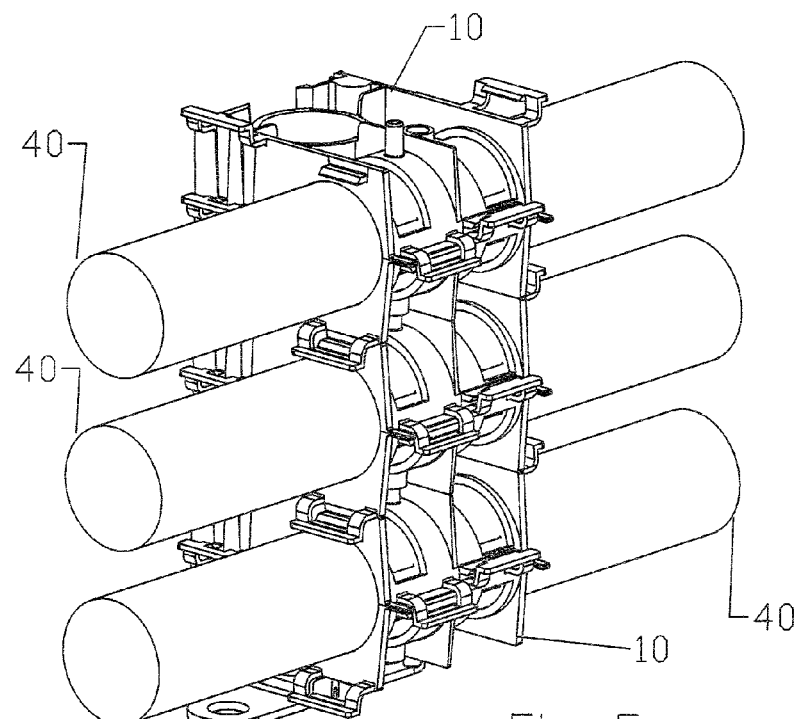
FIG. 5 is a perspective view of a plurality of the cable hangers of FIG. 3 in a stacked configuration closed around representative cables.
Figure 6:
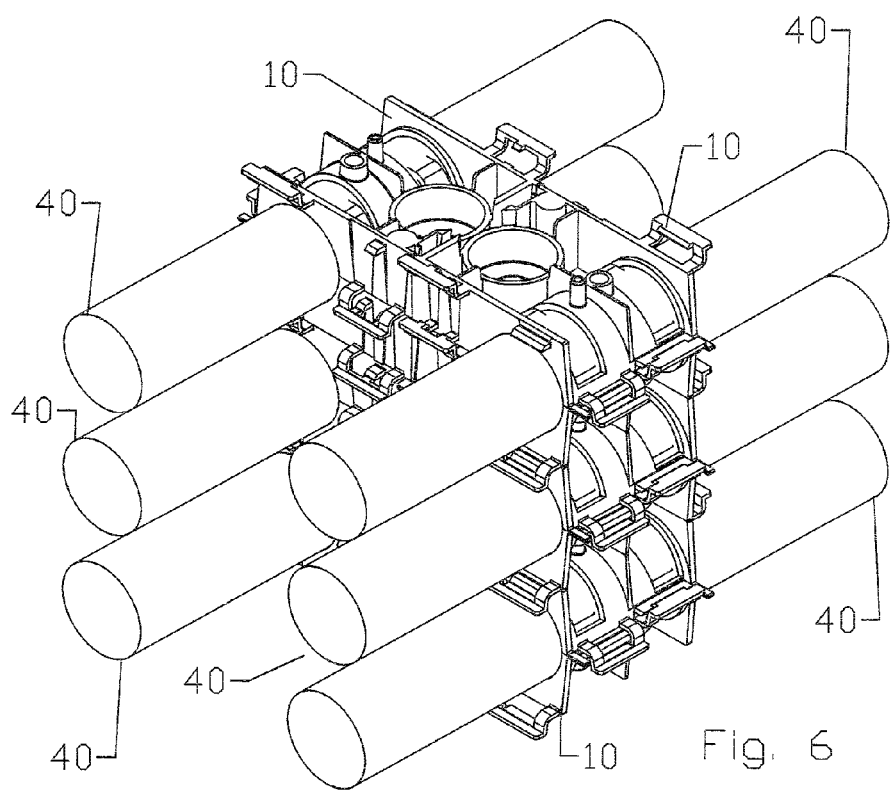
FIG. 6 is a perspective view of a plurality of cable hangers as shown in FIG. 5, also with a side stack of hangers attached.

FIGS. 4–6 demonstrate mounting hardware in the form of a ceiling adapter plate 60 with a washer 58 for securing the bolt 52 to the ceiling adapter plate 60 which is in turn mounted to the desired mounting surface. Alternative mounting configurations may include any manner of attachment wherein a bolt 52 or the like is secured to a desired mounting surface and the cable hanger 10 attached in turn to the bolt 52 or the like as described hereinabove.

Multiple cable hanger(s) 10 may be vertically snapinterlocked together as shown in FIG. 5. A releasable snap-interlock means for interlocking between cable hanger(s) 10 is provided, for example, by the engagement between a plurality of interlock flange(s) 62 and interlock fin(s) 64 distributed around a vertical mating surface 63 of the front shell half 12 that are adapted to mate with and engage corresponding interlock flange(s) 62 and interlock fin(s) 64 distributed around the vertical mating surface 63 of the rear shell half 14 as the rear shell half 14 of a cable hanger 10 is lowered upon a front shell half 12 of a base cable hanger 10. Interlock alignment pin(s) 66 that fit into corresponding interlock aperture(s) 68 or the like formed in the shell halves 12, 14, for example projecting outward from the outer surfaces 24, 26 may be used to align the respective interlock flange(s) 62 with the interlock fin(s) 64 and also ensure that the shell halves 12, 14 are aligned together whereby the longitudinal axis of the cable space(s) 44 of each cable hanger 10 are parallel. Further alignment may be incorporated by recessing a, for example, cylindrical mounting post 70 coaxial with the bolt hole 50 on the front shell half 12 below the vertical mating surface 63 and similarly extending a corresponding mounting post 70 to project beyond the mating surface 63 of the rear shell half 14. Thereby, when vertically snap-interlocked together, the extending mounting post 70 of a rear shell half 14 mates into the recessed area of the corresponding front shell half 12 mounting post 70.

The outer surfaces 24, 26 of the cable hanger 10 may be reinforced via addition of a reinforcing fin 71 extending from the outer surfaces 24, 26 to their respective vertical mating surface(s) 63. Also, the reinforcing fin 71 may extend laterally to join the cylindrical mounting post(s) 70.

A cable hanger 10 may also be coupled with a cable hanger 10, side to side through the addition of suitable side interlocking means for latching such as at least one side latch 72 that mates with a corresponding side aperture 76 in the second cable hanger 10. As shown in figures 1, 2 and 5, the side interlocking means may be formed in a connection side 74 of each cable hanger 10. To allow side to side interconnection of a unitary cable hanger 10 design, the side latch(s) 72 and side aperture(s) 76 are arrayed on the connection side 74 in complementary positions.

The various closure flange 28 to closure fin 30 and interlock flange 62 to interlock fin 64 pairs are arranged upon the cable hanger 10 clear of the connection side 74 area to allow each to be engaged and or released without interfering with a side attached cable hanger 10. Further, each of the side by side coupled cable hanger(s) 10 may be stacked vertically as described herein above to form a high density cable hanger 10 assembly, as shown for example in FIG. 6, requiring only a single attachment point to the desired support structure.

One skilled in the art will recognize that the interlock flange(s) 62, closure flange(s) 28, side latch(s) 72 and their respective mating fin(s) and or aperture(s) may alternatively be formed in numerous well known alternative configurations having an equivalent effect of securely snap-interlocking the respective components to each other. Therefore, each of the selected labels used for these elements should be recognized as functionally descriptive for clarity rather than as specific structural limitations to the type of snap-interlocking that may be applied when practicing the various embodiments of the invention. The cable hanger 10 may be cost efficiently formed by injection molding as a unitary structure from a suitable polymer resin, such as conventional thermoset or thermoplastic resins. Suitable injection molding materials include polycarobonate, polypropylene, polyoxymethylene (POM), polybutylene terephthalate (PBT) and acetal copolymer or the like. Depending upon the material used and the intended application, additives such as carbon black for UV protection may be included. For underground and or tunnel applications, non-halogenated fire retardant plastics may be used. In use, a cable 40 is positioned within one of the inner surfaces 20, 22 and the shell halves 12, 14 folded towards each other along the assembly hinge(s) 16, 18 to surround the cable 40 within the cable area 44. As the shell halves 12, 14 close upon each other, spring finger(s), if present, are deflected against the cable 40, creating a bias against and thereby gripping the cable 40 securely, the various guide surfaces engage to ensure alignment between the shell halves 12, 14 and the closure flange(s) 28 and closure fin(s) 30 snap-interlock with each other. The cable hanger 10 may then be secured by mounting hardware to a desired mounting point, for example via a bolt 52 or the like which is, for example, inserted through the bolt hole(s) 54, 55 and secured with a nut 50 tightened against the recessed nut surface 56.

Once a single cable hanger 10 has been secured, additional cable hanger(s) 10 may be vertically or connection side 74 to connection side 74 snap interlocked as described herein. Because the base cable hanger 10 is secured using a single set of mounting hardware coupled only to the base cable hanger 10, further cable hanger(s) 10 may be added without disassembly or changing out of the mounting hardware. Therefore, to install a single cable hanger, a multiple cable hanger assembly, or to add additional cable 40 carrying capacity to an existing cable hanger 10 installation over time only a single type of cable hanger 10 is required. Further, only a single type of mounting hardware needs to be distributed with the cable hangers independent of the number of cable hangers that may be installed originally and over time as the number of required cables changes. Still further, installation of additional cable hanger(s) 10 to an existing installation is simplified because the existing cable hanger(s) 10 need not be released even momentarily.

From the foregoing, it will be apparent that the present invention brings to the art an expandable cable mounting solution having improved performance, ease of installation and significant manufacturing and installation cost efficiencies.

| 10 | cable hanger |
| --- | --- |
| 12 | front shell half |
| 14 | rear shell half |
| 16 | assembly hinge |
| 20 | front shell half inner surface |
| 22 | rear shell half inner surface |
| 24 | front shell half outer surface |
| 26 | rear shell half outer surface |
| 28 | closure flange |

-continued

| | |
|---|---|
| 30 | closure fin |
| 32 | closure alignment pin |
| 34 | closure aperture |
| 40 | cable |
| 42 | gripping finger |
| 44 | cable space |
| 48 | rib |
| 50 | nut |
| 50A | nut (adapter plate) |
| 52 | bolt |
| 54 | front shell half bolt hole |
| 55 | rear shell half bolt hole |
| 56 | recessed nut surface |
| 58 | washer |
| 60 | ceiling adapter plate |
| 62 | interlock flange |
| 63 | vertical mating surface |
| 64 | interlock fin |
| 66 | interlock alignment pin |
| 68 | interlock alignment aperture |
| 70 | mounting post |
| 71 | reinforcing fin |
| 72 | side latch |
| 74 | connection side |
| 76 | side aperture |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

The invention claimed is:

1. A cable hanger for mounting a cable having an outer diameter to a support structure, comprising:
a front shell half that mates with a rear shell half, the front shell half and the rear shell half having a front shell half inner surface and a rear shell half inner surface, that cooperate with each other to secure the outer diameter of the cable within a cable space;
the mating of the front shell half and the rear shell half releasably secured by at least one closure flange(s) of the front shell half adapted to retain at least one closure fin(s) of the rear shell half;
the front shell half and the rear shell half each having, along a vertical mating surface, at least one interlock flange(s) and at least one interlock fin(s);
the interlock flange(s) and interlock fin(s) adapted to interlock with corresponding interlock flange(s) and interlock fin(s) of a second cable hanger positioned against the cable hanger along the vertical mating surface;
a front shell half bolt hole through the front shell half and a rear shell half bolt hole through the rear shell half; the front shell half bolt hole aligning with the rear shell half bolt hole when the front shell half is mated to the rear shell half;
a recessed nut surface of the front shell half is recessed below the vertical mating surface whereby a bolt extending through the front and rear shell half bolt holes may be secured with a nut against the recessed nut surface to retain the cable hanger to the support structure without having the bolt projecting above the vertical mating surface.

2. The device of claim 1, further including a connection side of the cable hanger having at least one side latch(s) and at least one side aperture(s);
the side latch(s) and side aperture(s) adapted to couple with side latch(s) and side aperture(s) of a third cable hanger, positioned connection side to connection side with the cable hanger.

3. The device of claim 2, wherein the closure flange, closure fin, interlock flange and interlock fin are positioned about the cable hanger whereby they may be disengaged without accessing the connection side.

4. The device of claim 1, wherein the front shell half and the rear shell half are formed as a unitary component.

5. The device of claim 4, wherein the front shell half and the rear shell half are interconnected by a assembly hinge.

6. The device of claim 4, wherein an assembly hinge between the front shell half and the rear shell half is frangible.

7. The device of claim 1, further including a gripping finger which extends within the cable space;
the gripping finger adapted to deflect upon entry of the cable into the cable space, creating a bias against the cable.

8. The device of claim 1, further including at least one rib projecting from the front shell half inner surface.

9. The device of claim 1, further including a mounting post coaxial with the front shell half bolt hole and the rear shell half bolt hole; the mounting post recessed below the vertical mating surface of the front shell half and extending beyond the vertical mating surface of the rear shell half.

10. The device of claim 1, further including a front shell half outer surface and a rear shell half outer surface opposite the front shell half inner surface and the rear shell half inner surface, respectively; and
an interlock alignment pin and a corresponding interlock alignment aperture formed in each of the front shell half outer surface and the rear shell half outer surface adapted to mate with a corresponding interlock alignment pin and interlock alignment aperture of the second cable hanger as the second cable hanger is mated with the cable hanger along the vertical mating surface.

11. The device of claim 9, further including a reinforcing fin extending from the mounting post and front shell half outer surface to the vertical mating surface.

12. The device of claim 1, wherein the cable hanger is injection molded using a thermoplastic resin.

13. A cable hanger for mounting a cable having an outer diameter to a support structure, comprising:
a front shell half that mates with a rear shell half the front shell half and the rear shell half, each having an inner surface adapted to cooperate with the other to secure the outer diameter of the cable within a cable space;
the mating of the front shell half and the rear shell half releasably secured by at least one closure flange(s) of the front shell half adapted to retain at least one closure fin(s) of the rear shell half;

the front shell half and the rear shell half each having, along a vertical mating surface, at least one interlock flange(s) and at least one interlock fin(s);

the interlock flange(s) and interlock fin(s) adapted to interlock with corresponding interlock flange(s) and interlock fin(s) of a second cable hanger positioned against the cable hanger along the vertical mating surface;

a front shell half bolt hole through the front shell half and a rear shell half bolt hole through the rear shell half;

the front shell half bolt hole aligning with the rear shell half bolt hole when the front shell half is mated to the rear shell half;

a recessed nut surface of the front shell half is recessed below the vertical mating surface whereby a bolt extending through the front and rear shell half bolt holes may be secured with a nut against the recessed nut surface to retain the cable hanger to the support structure without having the bolt projecting above the vertical mating surface;

a connection side of the cable hanger having at least one side latch(es) and at least one side aperture(s);

the side latch(es) and side aperture(s) adapted to couple with side latch(es) and side aperture(s) of a third cable hanger, positioned connection side to connection side with the cable hanger.

14. The device of claim 13, further including a gripping finger which extends within the cable space; the gripping finger adapted to deflect upon entry of the cable into the cable space, creating a bias against the cable.

15. A cable hanger for mounting a cable having an outer diameter to a support structure, comprising:

a front shell half that mates with a rear shell half, the front shell half and the rear shell half each having an inner surface adapted to cooperate with the other to secure the outer diameter of the cable within a cable space;

the mating of the front shell half and the rear shell half releasably secured by a means for closure;

the front shell half and the rear shell half each having, along a planar vertical mating surface, a means for interlocking; a vertical mating surface parallel to a longitudinal axis of the cable space the means for interlocking adapted to interlock with the means for interlocking of a second cable hanger positioned against the cable hanger along the vertical mating surface;

the means for interlocking engagable in a direction normal to the vertical mating surface;

a connection side of the cable hanger having a means for latching adapted to couple with the means for latching of a third cable hanger, positioned connection side to connection side with the cable hanger.

* * * * *